3,555,662
METHOD OF MANUFACTURING UNIFORM PRELOAD BALL JOINT ASSEMBLIES
Thomas C. Powell, Saginaw, Mich., assignor to General Motors Corporation, Detroit, Mich., a corporation of Delaware
Filed May 6, 1968, Ser. No. 726,911
Int. Cl. B23k 29/00; B23p 11/02, 19/00
U.S. Cl. 29—436
3 Claims

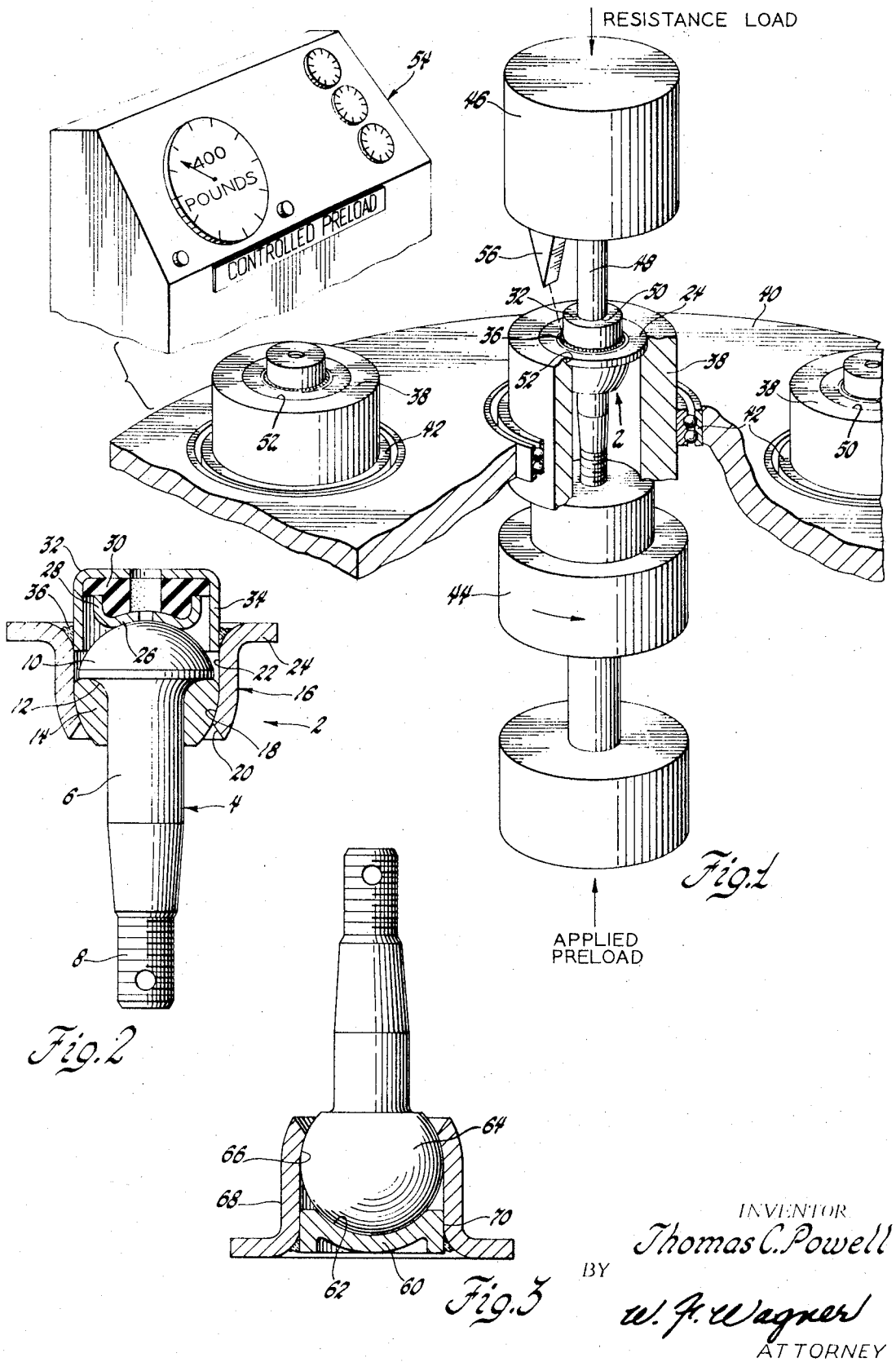

ABSTRACT OF THE DISCLOSURE

A ball and socket assembly in which precision bearing engagement is accomplished by forming the socket of two telescoping halves arranged in surrounding relation with the ball. During assembly, the halves are subjected to an externally applied force which is sustained while the halves are secured together by a continuous circumferential bond which seals the telescoping juncture and maintains the preload after removal of the externally applied force.

---

This invention relates to a method of manufacturing ball joints enabling establishment and maintenance of a consistent level of preloading.

Commercially manufactured automotive suspension ball joints generally fall into two broad classes, load sustaining and non-load sustaining. Generally, load sustaining joints, which may be either of the compression or tension type, require no preloading of the ball relative to the socket due to the fact that the weight of the vehicle is operative to maintain the requisite bearing engagement. Non-load sustaining joints, however, depend for geometric accuracy and other performance characteristics upon establishment of a continuous biasing force built into the joint which acts to maintain the ball in constant bearing engagement with the socket. In practice, non-load sustaining joints usually exhibit a relatively high level of preload for the additional purpose of providing resistance to turning torque which beneficially affects the steering response of the vehicle.

In the prior art, preloading of ball joint assemblies has usually been accomplished by utilization of coil, Belleville or rubber springs disposed in compression between the ball and cover portion of the ball socket. Conventionally, the degree of compression exerted on the spring has depended solely on the "stack-up" dimension created between the socket cover and the ball. The "stack-up" dimension is, of course, subject to variation resulting from individual manufacturing tolerances and their cumulative effects. While such manufacturing tolerances are of very small order, due to the extremely small space available for the spring, the rate thereof is necessarily very high and hence even very slight variation in stack-up tolerances results in undesirably wide variation in the preload exhibited from one ball joint assembly to another.

In the case of the load sustaining ball joint, while the same type of criticality does not exist, in practice, play or looseness exhibited by such joints when in a non-load sustaining condition, such as for example when the vehicle is elevated on a frame engaging service station lift, is frequently misconstrued as an indication of a faulty or worn assembly. Consequently, in the case of a load sustaining joint, any significant play is also undesirable. Accordingly, the present invention is concerned with providing load sustaining ball joints exhibiting highly uniform mating precision and non-load sustaining ball joints exhibiting a highly uniform degree of preload.

An object of the present invention is to provide a ball joint assembly in which precision bearing engagement is accomplished by an externally calibrated and applied force exerted during assembly rather than being a function of dimensional stack-up relation of the parts.

Another object is to provide an assembly of the stated character in which preloading or precision mating of the ball and socket is accomplished by utilizing a pair of telescoping socket members which while being subjected to an externally applied sustained load are secured together by a bonding process which both circumferentially seals the mating halves and maintains the same in relative positions effective to maintain the preload after removal of the sustained load.

The foregoing and other objects, advantages and features of the invention will become more readily apparent as reference is had to the accompanying specification and drawings wherein:

FIG. 1 is a schematic view of a turret assembly machine illustrating a method of manufacture in accordance with the invention;

FIG. 2 is a sectional side elevational view of a preloaded ball joint assembly manufactured in accordance with the invention; and FIG. 3 is a sectional elevational view of a lash-free load sustaining ball joint manufactured in accordance with the invention.

Referring now to the drawings and particularly FIG. 2, there is shown a preloaded ball joint assembly 2 of the type generally utilized to universally pivotally connect the upper suspension control arm of a vehicle with the upper end of a wheel spindle, both not shown. Assembly 2 comprises a ball stud element 4 having a shank portion 6 terminating in a threaded end 8. At its upper end, stud 4 is formed with a semi-spherical head portion 10 having a lower annular shoulder 12. A conventional sintered iron bearing ring 14 surrounds shank 6 and bears upwardly against shoulder 12. Surrounding head 10 and ring 14 is a socket member 16 having a parti-spherical wall portion 18 arranged in mating engagement with the outer spherical surface of ring 14 and terminating in a generally elliptical opening 20 surrounding stud 6. Wall portion 18 progresses upwardly and merges with cylindrical wall portion 22 terminating in a radially outwardly flared flange 24. Disposed centrally over ball head 10 is a cup-shaped bearing seat 26 formed with a concave lower wall portion 28 arranged in mating engagement with head 10. Disposed in cup-shaped seat 26 is a rubber or other suitable elastomeric element 30 which in turn has disposed thereover an inverted cup-shaped socket cover 32 having a depending cylindrical wall portion 34 adapted for telescoping sliding fit with the inner periphery 36 of the cylindrical wall portion 22 of socket 16.

In accordance with the principal feature of the invention, the ball and socket assembly 2 is assembled loosely in the relationship just described and then disposed in a fixture adapted to support the socket 16 in a fixed vertical position. Cover 32 is then subjected to a calibrated externally applied axial pressure which depresses the cover until the rubber element is compressed to a degree exactly balancing the applied pressure. While rubber element 30 is maintained in this stressed condition, the juncture 36 between socket cover wall 34 and the inner periphery of socket wall 22 is sealed, in a manner shortly to be described, so as to maintain the socket and cover in their adjusted vertical positions after removal from the fixture. As a result in each successive assembly so manufactured, the preload force exerted on the ball exactly corresponds to the externally applied pressure, rather than being a variable function of stack-up tolerances.

Referring now to FIG. 1, in a preferred method of manufacturing, a plurality of assembly fixtures 38 are disposed at circumferential intervals around a turntable or turret structure 40, with each fixture being vertically displaceable and rotatably disposed within a bearing assembly 42. Each fixture includes a driver element 44 adapted to impart rotation thereto in a manner shortly to be described. At one or more intervals around the turret 40 is a fixed welding station 46 which includes a depending shaft 48 having a lower end defining a fixed stop 50. Turret 40 is provided with an indexing mechanism of conventional construction, not shown, adapted to sequentially index the fixtures 38 into a position beneath the welding station so that the geometric center of the fixture is aligned with the geometric center of the fixed stop 50. Additional mechanism of conventional construction, not shown, operates to impart rotation to the driver 44 of the fixture aligned with the welding station. Coincidentally, the driver and fixture are displaced upwardly in bearing 42 by a suitable lift mechanism, not shown, the thrust of which is regulated by a controlled preload station 54. In operation, the ball joint assemblies are loosely assembled in the manner previously described and loaded in the fixtures 38 with the flange 24 of the socket piloted in the annular recess 52 at the upper end of the fixture. The table is then indexed to bring a loaded fixture under the welding station 46. The lift mechanism is then actuated and raises the fixture toward the stop 50. After the socket cover 32 engages the stop, the lifting mechanism continues upward displacement of the fixture until the applied pre-load pressure determined by the pre-load calibration station 54 is balanced by the compression reaction of the rubber element 30. Thereafter, while maintaining this preload, rotation of fixture 38 commences. Simultaneously, the welding station is activated, causing an electron beam gun 56 to emit a stream of electrons aimed at the juncture 36 between the cover 32 and flange 24. As a result, a continuous circumferential bond or weld is established between the cover and socket. Upon completion of the weld, the welder is deactivated and the fixture retracted. The table then indexes to the next station and the sequence is repeated.

While the electron beam welder per se forms no part of the invention, it is important to note that the localized concentration of heat and the speed of welding attainable thereby is such that the rubber element is not adversely affected by heat deterioration such as would result from conventional welding. Additionally, utilization of the electron beam welded eliminates the need for fluxes and other additives required in conventional welding and thereby reduces or eliminates the possibility of chemical contamination of the interior of the assembled joint. Further, by provision of modest radial clearance between the cover wall 34 and the inner periphery 36 of the socket, considerably improved concentricity may be achieved between the socket and cover which, of course, contributes further to functional uniformity of the assemblies so produced.

In FIG. 3, there is illustrated a lash-free load supporting ball joint assembly which is susceptible to manufacture in precisely the same sequence just described. However, since an assembly of the type shown in FIG. 2 achieves operational precision mating engagement as an incidence of a constant load exerted thereon by the weight of the vehicle, the bearing seat and rubber element are eliminated and the socket cover 60 is preformed with a spherical surface 62 conforming precisely with adjacent surfaces of the ball 64. Naturally, the high level of preloading utilized in joints of the type shown in FIG. 2 is neither required nor desirable in the form shown in FIG. 3 and in consequence the controlled preload exerted during assembly is reduced to a level just sufficient to assure mating engagement between the cover 60, ball 64 and the spherical surface 66 of the socket 68. Additionally, as previously described, by providing a limited radial clearance between the vertical wall 70 of cover 60 and the adjacent inner periphery of the socket, establishment of a high degree of concentricity between the ball, cover and socket as an incidence of controlled preload is assured.

From the foregoing, it will be seen that a novel and improved method of achieving uniformity of precision bearing engagement and preload level in automotive ball joints has been provided. The results achieved are not only highly consistent and susceptible to high speed production but additionally substantially reduce the degree of criticality in manufacturing tolerances of the component parts of the joint.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In a ball and socket assembly of the type in which precision bearing engagement between the ball and socket is accomplished as an incidence of assembly, a method of manufacture comprising the steps of forming a socket with an aperture at one end, a generally parti-spherical bearing portion adjacent said aperture, and a cylindrical wall at the other end, forming a socket cover having a generally parti-spherical bearing portion and a cylindrical surface integral therewith, said cylindrical surface being substantially concentric with said generally parti-spherical bearing portion and adapted for telescoping movement relative to said cylindrical wall, inserting a ball stud in said socket with the ball portion in bearing engagement with said socket bearing portion and the stud extending through said aperture, inserting said socket cover into the end of said socket having said cylindrical wall until said parti-spherical bearing seat is in abutting relation with said ball, said cylindrical surface forming a juncture with said cylindrical wall, fixedly supporting said socket in a plane normal to the axis of said cylindrical wall, applying an axial load to said cover just sufficient to assure mating engagement between said ball and said bearing portions whereby the cover is substantially undeflected by said axial load, and forming a continuous circumferential seal joining the juncture of said cover and said socket by relative rotation between said assembly and an electron beam aimed at the juncture of said socket and cover while maintaining said load whereby a substantially lash-free ball and socket assembly is provided.

2. In a ball and socket assembly of the type in which preloaded precision bearing engagement between the ball and socket is accomplished as an incidence of assembly, a method of manufacture comprising the steps of forming a socket with an aperture at one end, a generally parti-spherical bearing portion adjacent said aperture, and a cylindrical wall at the other end, forming a socket cover having a cylindrical surface integral therewith, and adapted for telescoping movement within said cylindrical wall, inserting a ball stud in said socket with the ball portion in bearing engagement with said socket bearing portion and the stud extending through said aperture, providing a socket cover means in the cylindrical end of said socket, said socket cover means comprising a bearing seat in abutting relation with said ball, an elastomeric spring in abutting relationship with said bearing seat, and said socket cover abutting said elastomeric spring on the side opposite said bearing seat, said cylindrical surface on said socket cover being telescoped into the end of said socket having said cylidnrical wall and forming a juncture with said cylindrical wall, fixedly supporting said socket in a plane normal to the axis of said cylindrical wall, applying a controlled axial load only to said cover and forming a continuous circumferential seal joining the juncture of said cover and said socket by relative rotation between said assembly and an electron beam aimed at the juncture of said socket and cover while only said controlled axial load is maintained on said cover, whereby a ball and socket assembly having a preload substantially equal to the controlled axial load is provided.

3. In a ball and socket assembly of the type in which preloaded precision bearing engagement between the ball and socket is accomplished as an incidence of assembly, a method of manufacture comprising the steps of forming a socket with an aperture at one end, a generally partispherical bearing portion adjacent said aperture, and a cylindrical wall at the other end, forming a socket cover having an end wall and a cylindrical flange integral therewith and adapted for telescoping movement within said cylindrical wall, inserting a ball stud in said socket with the ball portion in bearing engagement with said socket bearing portion and the stud extending through said aperture, providing a socket cover means in the cylindrical end of said socket, said socket cover means comprising a bearing seat in abutting relation with said ball, a spring having one end in abutting relationship with said bearing seat, and said socket cover with its end wall abutting the other end of said spring and its cylindrical flange being telescoped into the end of said socket having said cylindrical wall and forming a juncture therewith, said spring spacing said bearing seat from said end wall of said socket cover, fixedly supporting said socket in a plane normal to the axis of said cylindrical wall, applying a controlled axial load only to said cover while said spring stores energy and spaces said bearing seat from said end wall of said socket cover and forming a continuous circumferential seal joining the juncture of said cover and said socket by relative rotation between said assembly and an electron beam aimed at the juncture of said socket and cover while only said controlled axial load is maintained on said cover, whereby a ball and socket assembly having a preload substantially equal to the controlled axial load is provided.

References Cited
UNITED STATES PATENTS

| | | | |
|---|---|---|---|
| 1,828,402 | 10/1931 | Geyer | 29—436X |
| 2,443,712 | 6/1948 | Alldredge | 29—434 |
| 3,395,442 | 8/1968 | Herbenar | 29—450X |
| 3,460,237 | 8/1969 | McClintock | 29—486X |
| 3,384,308 | 5/1968 | Cupler | 219—121(EB) |
| 3,418,708 | 12/1968 | Siver | 219—121(EB) |
| 3,440,392 | 4/1969 | Erlandson | 219—121(EB) |
| 3,449,542 | 6/1969 | Conner | 219—121(EB) |
| 3,455,239 | 7/1969 | Smith | 219—121(EB) |

WAYNE A. MORSE, Jr. Primary Examiner

U.S. Cl. X.R.

29—451, 486; 219—121